United States Patent
Kim et al.

(10) Patent No.: US 7,399,336 B2
(45) Date of Patent: *Jul. 15, 2008

(54) NON-MAGNETIC NICKEL POWDERS AND METHOD FOR PREPARING THE SAME

(75) Inventors: Soon-ho Kim, Seoul (KR); Jae-young Choi, Suwon-si (KR); Tae-wan Kim, Yongin-si (KR); Eun-bum Cho, Seoul (KR); Yong-kyun Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 133 days.

This patent is subject to a terminal disclaimer.

(21) Appl. No.: 11/393,691

(22) Filed: Mar. 31, 2006

(65) Prior Publication Data

US 2006/0169372 A1 Aug. 3, 2006

Related U.S. Application Data

(62) Division of application No. 10/819,917, filed on Apr. 8, 2004, now Pat. No. 7,182,801.

(30) Foreign Application Priority Data

Apr. 9, 2003 (KR) .................. 10-2003-0022217

(51) Int. Cl.
*B22F 1/00* (2006.01)
(52) U.S. Cl. ........................... 75/374; 148/513
(58) Field of Classification Search ............. 75/374; 148/513
See application file for complete search history.

(56) References Cited

U.S. PATENT DOCUMENTS

| | | | |
|---|---|---|---|
| 4,539,041 A | 9/1985 | Figlarz et al. | |
| 5,759,230 A * | 6/1998 | Chow et al. | 75/362 |
| 6,262,129 B1 | 7/2001 | Murray et al. | |
| 6,974,492 B2 * | 12/2005 | Harutyunyan et al. | 75/351 |
| 7,211,126 B2 * | 5/2007 | Kim et al. | 75/348 |
| 2006/0090601 A1 * | 5/2006 | Goia et al. | 75/374 |

FOREIGN PATENT DOCUMENTS

| | | |
|---|---|---|
| DE | 35 13 119 A1 | 10/1986 |
| DE | 35 13 132 A1 | 10/1986 |
| KR | 2002-094069 | 12/2002 |

OTHER PUBLICATIONS

Carturan G. et al., "Hexagonal Close Packed Nickel Powder: Synthesis, Structural Characterization and Thermal Behavior", Materials Letters, Aug. 1988, pp. 47-50, vol. 7, No. 1,2.

(Continued)

*Primary Examiner*—George Wyszomierski
(74) *Attorney, Agent, or Firm*—Buchanan Ingersoll & Rooney PC

(57) ABSTRACT

Provided are non-magnetic nickel powders and a method for preparing the same. The nickel powders have non-magnetic property and a HCP crystal structure. The method include (a) dispersing nickel powders with a FCC crystal structure in an organic solvent to prepare a starting material dispersion, and (b) heating the starting material dispersion to transform the nickel powders with the FCC crystal structure to the nickel powders with the HCP crystal structure. The nickel powders do not exhibit magnetic agglomeration phenomenon. Therefore, the pastes for inner electrode formation in various electronic devices, which contain the nickel powders of the present invention, can keep the well-dispersed state. Also, inner electrodes made of the nickel powders can have a low impedance value even at high frequency band.

6 Claims, 2 Drawing Sheets

OTHER PUBLICATIONS

D.A. Papaconstantopoulos et al., "Ferromagnetism in Hexagonal-Close-Packed Elements", Physical Review B, 1989, pp. 2526-2528, vol. 39, No. 4.

Giovanni Carturan et al., "Hexagonal Close Packed Nickel Powder: Synthesis, Structural Characterization and Thermal Behavior," Material Letters, North Holland Publishing Company, Amsterdam, NL, vol. 7, No. 1.2, Aug. 1988.

People's Republic of China Office Action dated Sep. 2, 2005 (with English translation).

* cited by examiner

NON-MAGNETIC NICKEL POWDERS AND METHOD FOR PREPARING THE SAME

This application is a divisional of patent application Ser. No. 10/819,917 filed on Apr. 8, 2004 now U.S. Pat. No. 7,182,801.

This application claims priority from Korean Patent Application No. 2003-22217, filed on Apr. 9, 2003, in the Korean Intellectual Property Office, the disclosure of which is incorporated herein in its entirety by reference.

BACKGROUND OF THE INVENTION

1. Field of the Invention

The present invention relates to nickel powders and a method for preparing the same.

2. Description of the Related Art

Nickel is a transition metal that belongs to the iron group in Period 4, Group VIII of the periodic table and is a crystalline substance with high melting point and excellent malleability.

Nickel powders are a particle-phase metallic nickel material. Nickel powders can be used as, for example, a material for inner electrodes in electronic devices such as multilayer ceramic capacitors (MLCCs), a magnetic material, an electrical contact material, a conductive adhesive material, or a catalyst.

Nickel is known as a representative of ferromagnetic substances. Ferromagnetic substances are those that are strongly magnetized in the direction of a magnetic field applied, and retain magnetization even when the magnetic field is removed.

When a non-magnetized ferromagnetic substance is exposed to an increasing magnetic field, magnetization occurs slowly at an early stage, which is called initial magnetization. Thereafter, the rate of magnetization increases and saturation occurs. When a magnetic field is decreased at a saturation state, magnetization is reduced. However, the reduction course of magnetization is different from the increase course of magnetization. Also, even when a magnetic field becomes zero, magnetization does not reach zero, which is called residual magnetization. When the direction of a magnetic field is reversed and the intensity of the reverse magnetic field is increased, magnetization reaches zero and then the direction of the magnetization is reversed. Thereafter, the reverse magnetization gradually reaches a saturation state. At this time, even when a magnetic field becomes zero, magnetization does not reach zero and reverse residual magnetization remains, thereby creating a closed curve which does not pass through the origin. The closed curve is called a magnetization curve. The magnetization curve is closely related with a magnetic domain structure.

It is known that a ferromagnetic substance has an increased magnetic moment, which is a causative factor of magnetization, produced by parallel electron spins. Also, it is assumed that a ferromagnetic substance has magnetic domains which are clusters of parallel spins. When a magnetic field is applied, magnetic domains are aligned in the direction of the magnetic field. Even when a magnetic field is removed, the orientations of the magnetic domains are maintained for a long time, thereby generating residual magnetization. In this regard, when a temperature of a ferromagnetic substance is raised, the alignment of electron spins in the ferromagnetic substance is randomized by thermal motion. As a result, the ferromagnetic substance loses ferromagnetism and is transformed into a paramagnetic substance. The temperature is called the Curie temperature. The magnitude of a reverse magnetic field necessary to reduce the magnetization of a magnetized magnetic substance to zero is the coercive force.

Magnetic properties of bulk nickel are as follows: about 353° C. of the Curie temperature, about 0.617 T of saturation magnetization, about 0.300 T of residual magnetization, and about 239 A/m of coercive force.

Allotropes of nickel that have been known until now include metallic nickel with a face-centered cubic (FCC) crystal structure and metallic nickel with a hexagonal close packed (HCP) crystal structure.

Almost all common nickel powders are ferromagnetic substances with a FCC crystal structure. There are very rare reports of preparation of nickel powders with a HCP crystal structure. It has been predicted that the nickel powders with a HCP crystal structure are also ferromagnetic substances.

Based on the Stoner theory, D. A. Papaconstantopoulos et al. predicted that HCP nickel must be a ferromagnetic substance [D. A. Papaconstantopoulos, J. L. Fry, N. E. Brener, "Ferromagnetism in hexagonal close packed elements", Physical Review B, Vol. 39, No. 4, 1989. 2. 1, pp 2526-2528].

With respect to preparation of inner electrodes for electronic devices that are representative application areas of nickel powders, conventional ferromagnetic nickel powders have the following disadvantages.

First, when nickel powders contained in pastes for nickel inner electrode formation by a printing method exhibit magnetism, the nickel powders are attracted to each other like magnets and agglomerated, which renders uniform paste formation difficult.

Second, an ultra-high frequency band is used in electronic devices with development of the mobile communication and computer technologies. However, magnetic substances have a high impedance value at such a high frequency band.

These problems can be solved by using non-magnetic nickel powders.

SUMMARY OF THE INVENTION

The present invention provides non-magnetic nickel powders.

The present invention also provides a method for preparing non-magnetic nickel powders.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

According to an aspect of the present invention, there is provided nickel powders, which are particle-phase metallic nickel materials that are non-magnetic and have a HCP crystal structure.

According to another aspect of the present invention, there is provided a method for preparing non-magnetic nickel powders with a HCP crystal structure, which include (a) dispersing nickel powders with a FCC crystal structure in an organic solvent to prepare a starting material dispersion and (b) heating the starting material dispersion to transform the nickel powders with the FCC crystal structure to the nickel powders with the HCP crystal structure.

The present inventors found that when nickel powders of FCC phase, which are ferromagnetic substances, are heated in an organic solvent, they are transformed from a FCC crystal structure to a HCP crystal structure and the nickel powders thus transformed are non-magnetic. There are no disclosures and predictions that nickel powders in an organic solvent are transformed by heating and the nickel powders thus transformed are non-magnetic.

Figure 1:
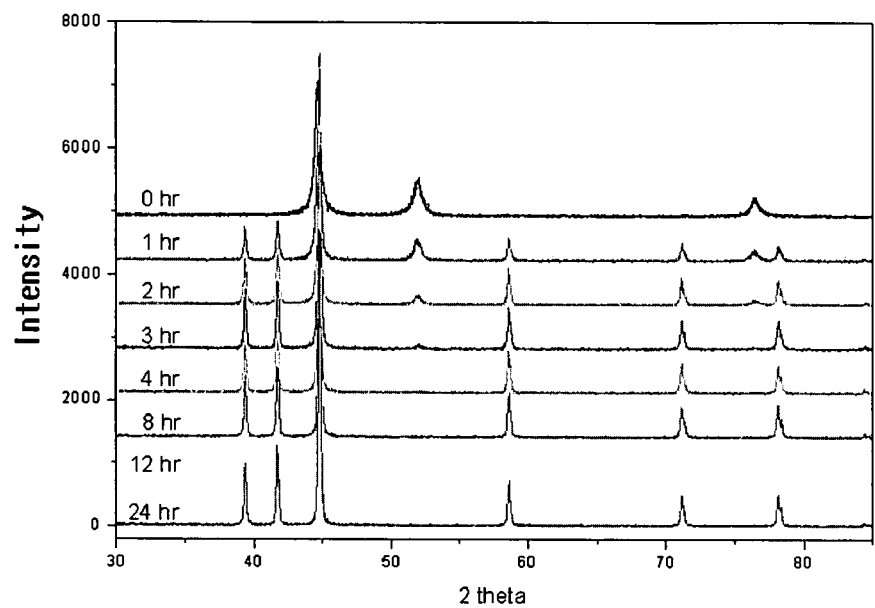
FIG. 1 is an X-ray diffraction (XRD) pattern of nickel powders according to an example of the present invention.

An X-ray diffraction (XRD) analysis result of the crystal structure of nickel powders according to a first example of the present invention is shown in FIG. 1. FIG. 1 shows overlapping XRD peaks of nickel powders prepared from a same starting material (i.e., FCC nickel powders with an average particle size of about 150 nm prepared by a liquid phase reduction method using hydrazine) with respect to a phase transition time. From the XRD patterns for the nickel powders at a phase transition time of 1 to 24 hours, it can be seen that nickel powders of the present invention have a HCP crystal structure. The XRD pattern represented by 0 hours is for the starting material with FCC phase.

The XRD pattern represented by 0 hours shows (111), (200), and (220) peaks at two (2) theta values of 44.5, 51.8, and 76.4. The (200) and (220) peaks at two theta values of 51.8 and 76.4 indicate that the starting material is of FCC phase.

The (200) and (220) peaks at two theta values of 51.8 and 76.4 that appear in the XRD pattern represented by 0 hours are gradually weakened with a phase transition time, and completely disappear in the XRD pattern represented by 4 hours. The XRD patterns after 4 hours show (010), (002), (011), (012), and (110) peaks at two theta values of 39.1, 41.5, 44.5, 58.4, and 71.2. These peaks indicate that corresponding nickel powders are of HCP phase. In the XRD patterns represented by 1, 2, and 3 hours, the peaks that represent FCC phase and HCP phase coexist. This means that corresponding nickel powders are a mixture of FCC nickel powders and HCP nickel powders. That is, in this example, the starting material is completely transformed after 4 hours.

Figure 3:
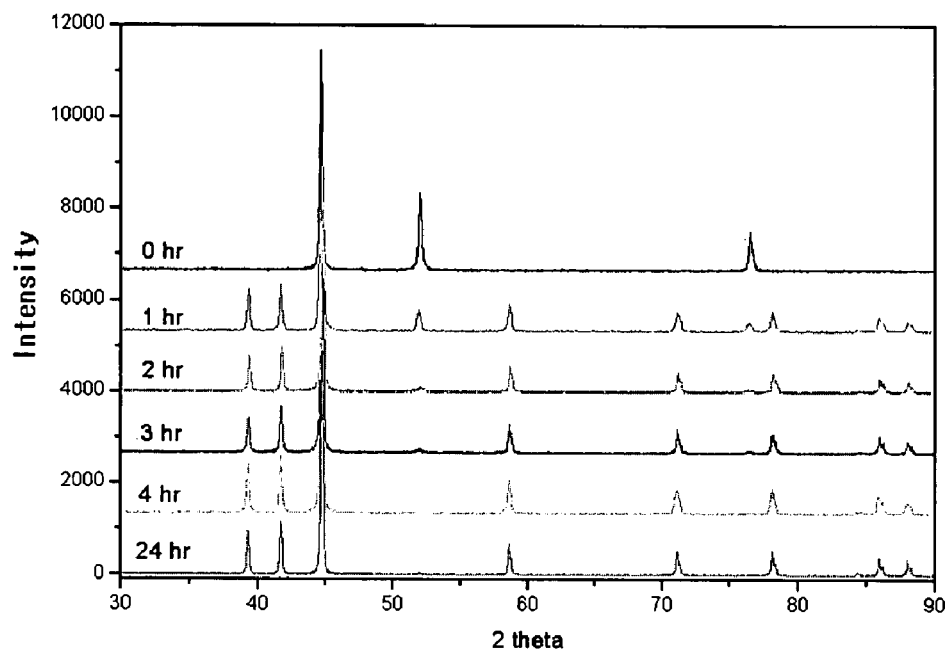
FIG. 3 is an XRD pattern of nickel powders according to another example of the present invention.

FIG. 3 is an XRD analysis result of the crystal structure of nickel powders according to a second example of the present invention. FIG. 3 shows overlapping XRD peaks of nickel powders prepared from a same starting material (i.e., FCC nickel powders with an average particle size of about 150 nm (NF1A, Toho, Japan)) with respect to a phase transition time. From the XRD patterns of the nickel powders at a phase transition time of 1 to 24 hours, it can be seen that nickel powders of the present invention have a HCP crystal structure. The XRD pattern represented by 0 hours is for the starting material.

Referring to FIG. 3, like in FIG. 1, the (200) and (220) peaks at two theta values of 51.8 and 76.4 that appear in the XRD pattern represented by 0 hours are gradually weakened with a phase transition time and completely disappear in the XRD pattern represented by 4 hours. That is, in this embodiment, phase transition is completed after 4 hours.

The completion time of phase transition may vary according to process parameters such as the type of the organic solvent, heating temperature, and the particle size of the starting material, but is not an important factor in the present invention. The important matter is that nickel powders prepared by the phase transition have a HCP crystal structure.

Figure 2:
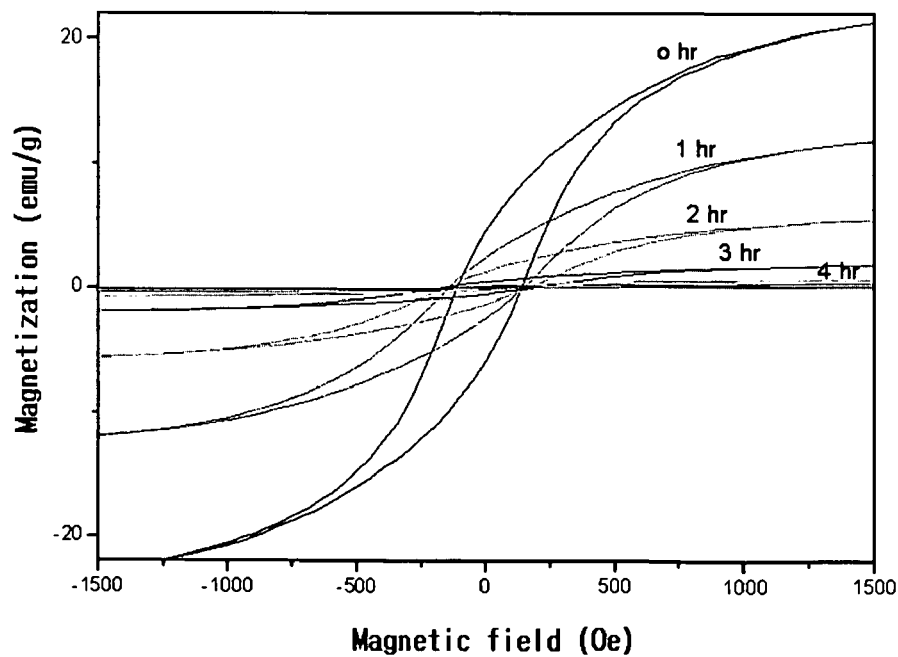
FIG. 2 is a magnetization curve of the nickel powders according to an example of the present invention.
Figure 4:
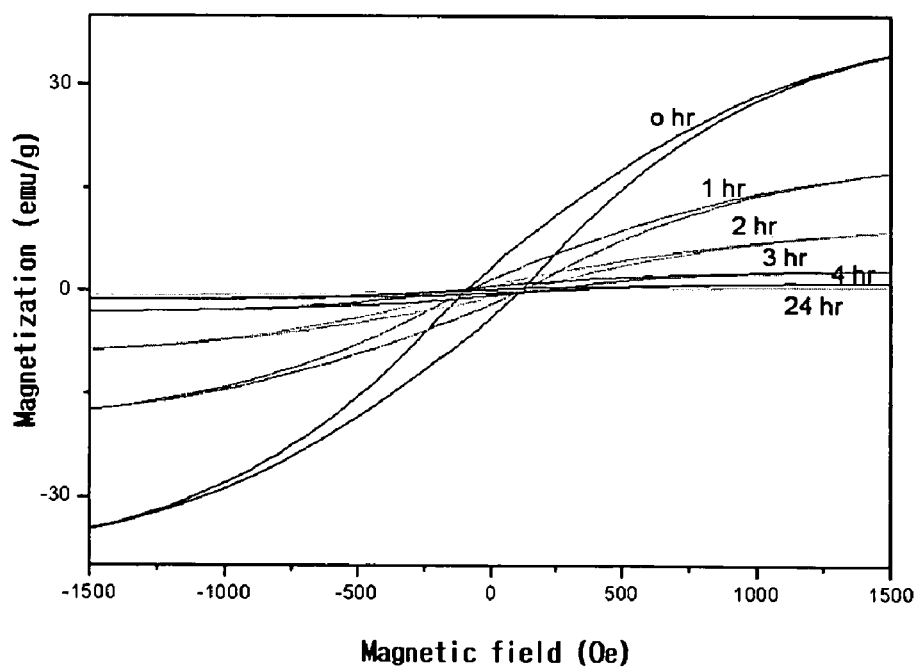
FIG. 4 is a magnetization curve of the nickel powders according to another example of the present invention.

Nickel powders of the present invention are non-magnetic can be seen from magnetization curves shown in FIGS. 2 and 4.

FIG. 2 is a magnetization curve of the nickel powders according to the first example of the present invention. FIG. 2 shows overlapping magnetization curves of nickel powders prepared from a same starting material (i.e., FCC nickel powders with an average particle size of about 150 nm prepared by a liquid phase reduction method using hydrazine) with respect to a phase transition time. From the magnetization curves of the nickel powders at a phase transition time of 1 to 24 hours, it can be seen that the magnetization levels of the nickel powders decrease with increasing phase transition time. The magnetization curve represented by 0 hours is for the starting material.

In FIG. 3, the magnetization curves for the nickel powders at a phase transition time of 4 hours or more are unidentifiable due to superposition. It appears that non-magnetization capability of the nickel powders is almost completed after phase transition for 4 hours. Variations in residual magnetization and saturation magnetization of the nickel powders of the first example with respect to a phase transition time are summarized in Table 1 below.

TABLE 1

| Phase Transition Time (hours) | Residual Magnetization (emu/g) | Saturation Magnetization (emu/g) |
|---|---|---|
| 0 (FCC phase) | 5.25 | 24.49 |
| 1 | 2.42 | 13.13 |
| 2 | 1.29 | 6.165 |
| 3 | 0.481 | 2.066 |
| 4 | 0.194 | 0.784 |
| 5 | 0.100 | 0.392 |
| 6 | 0.0669 | 0.250 |
| 7 | 0.0510 | 0.193 |
| 8 | 0.0301 | 0.137 |
| 9 | 0.0255 | 0.103 |
| 10 | 0.0210 | 0.0857 |
| 12 | 0.0196 | 0.0791 |
| 18 | 0.00822 | 0.0641 |
| 24 | 0.00753 | 0.0543 |

FIG. 4 is a magnetization curve of the nickel powders according to the second example present invention. FIG. 4 shows overlapping magnetization curves of nickel powders prepared from a same starting material (i.e., FCC nickel powders with an average particle size of about 150 nm (NF1A, Toho, Japan)) with respect to a phase transition time. From the magnetization curves of the nickel powders at a phase transition time of 1 to 24 hours, it can be seen that the magnetization levels of the nickel powders decrease with increasing phase transition time. The magnetization curve represented by 0 hours is for the starting material.

Variations in residual magnetization and saturation magnetization of the nickel powders of the second example with respect to a phase transition time are summarized in Table 2 below.

TABLE 2

| Phase Transition Time (hours) | Residual Magnetization (emu/g) | Saturation Magnetization (emu/g) |
|---|---|---|
| 0 (FCC phase) | 3.467 | 40.20 |
| 1 | 1.742 | 19.92 |
| 2 | 0.879 | 9.91 |
| 3 | 0.683 | 3.35 |

TABLE 2-continued

| Phase Transition Time (hours) | Residual Magnetization (emu/g) | Saturation Magnetization (emu/g) |
| --- | --- | --- |
| 4 | 0.241 | 1.02 |
| 24 | 0.0120 | 0.0721 |

As seen from Tables 1 and 2, the present invention can provide nickel powders with the residual magnetization of about 2 emu/g or less, preferably about 1 emu/g or less, and more preferably about 0.2 emu/g or less. Also, the present invention can provide nickel powders with the saturation magnetization of about 20 emu/g or less, preferably about 10 emu/g or less, and more preferably about 1 emu/g or less.

There are no particular limitations on the average particle size of nickel powders of the present invention. The average particle size of nickel powders of the present invention may be substantially the same as that of the FCC nickel powders that are used as a starting material. Generally, the average particle size of, nickel powders of the present invention may be in a range of about 30 to 800 nm. In particular, it may be preferably about 30 to 300 nm when the nickel powders are used in pastes for inner electrode formation in MLCCs. The upper limit and lower limit of the average particle size of nickel powders may vary according to application areas of the nickel powders. The limitation reasons of the average particle size of nickel powders are omitted herein.

Hereinafter, a method for preparing non-magnetic nickel powders with a HCP crystal structure will be described in detail.

A method for preparing non-magnetic nickel powders with a HCP crystal structure include (a) dispersing nickel powders with a FCC crystal structure in an organic solvent to prepare a starting material dispersion and (b) heating the starting material dispersion to transform the nickel powders with the FCC crystal structure to the nickel powders with the HCP crystal structure.

The reason for the phase transformation of nickel powders by heating in an organic solvent has not been elucidated, but it seems that metallic nickel is dissolved in the organic solvent and then is recrystallized or reduced. Even though the exact mechanism of the phase transition has not been elucidated, the effectiveness of the present invention would not be affected.

The organic solvent may be a glycol based organic solvent. Examples of the glycol based organic solvent include ethyleneglycol, propyleneglycol, diethyleneglycol, triethyleneglycol, dipropyleneglycol, hexyleneglycol, and butyleneglycol.

The nickel powders of FCC phase used as a starting material are commercially available or can be obtained by one of known nickel powder preparation methods. There are no particular limitations on the average particle size of the nickel powders of FCC phase used as a starting material. FCC nickel powders with an average particle size and particle size distribution that are generally required in the related application areas may be used. As the particle size of the starting material decreases, phase transition may be promoted, and as the particle size of the starting material increases, phase transition may be retarded. Thus, it is preferable to raise the heating temperature for the starting material with a large particle size.

In step (a), there are no particular limitations on the content of the nickel powders of FCC phase in the dispersion provided that the nickel powders can be well dispersed in the organic solvent. However, if the content of the nickel powders of FCC phase is too low, the organic solvent may be consumed excessively. On the other hand, if it is too high, the nickel powders may not be well dispersed. In this regard, the content of the nickel powders of FCC phase may be in a range of about 0.01 to about 30 wt %.

In a case where a material which is solid at room temperature such as 2,3-butyleneglycol with a melting point of 34.4° C. is used as the organic solvent, step (a) may be preformed by heating at a temperature above the melting point of the organic solvent.

In step (b), if the heating temperature for the dispersion is too low, the phase transition from FCC to HCP for the nickel powders may not be completed. Even if the heating temperature is too high, phase transition effect may be saturated. And, the organic solvent used may be thermally decomposed. In this regard, the heating temperature for the dispersion may be in a range of about 150 to about 380° C.

In an embodiment of a method of the present invention that uses an airtight reaction vessel provided with a reflux cooling apparatus for the organic solvent, it is preferable to set the heating temperature for the dispersion to about the boiling point of the organic solvent. If the heating temperature is excessively lower than the boiling point of the organic solvent, phase transition may not be completed. On the other hand, if it is excessively higher than the boiling point of the organic solvent, there arises a problem in that a reaction vessel resistant to high pressure must be used. In this regard, it is preferable to set the heating temperature to a range of the boiling point of the organic solvent ±5° C. More preferably, the dispersion may be heated so that the organic solvent of the dispersion comes to a boil.

There are no particular limitations on a phase transition time, i.e., a time for which the dispersion is heated for phase transition. The phase transition may be continued for a sufficient time so that substantially all of the nickel powders of FCC phase are transformed to the nickel powders of HCP phase. The phase transition time according to concrete reaction conditions can be easily determined.

When the phase transition is completed, the nickel powders of HCP phase are separated from the dispersion by washing and drying that are generally used in preparation of nickel powders.

The nickel powders of HCP phase prepared according to the method of the present invention have non-magnetic property.

Hereinafter, the present invention will be described more specifically by Examples. However, the following Examples are provided only for illustrations and thus the present invention is not limited to or by them.

EXAMPLE 1

Nickel powders of FCC phase with an average particle size of about 150 nm were prepared by a liquid phase reduction method using hydrazine. The XRD pattern and magnetization curve for the nickel powders of FCC phase thus prepared are respectively shown in FIG. 1 (represented by 0 hours) and FIG. 2 (represented by 0 hours).

100 g of the nickel powders of FCC phase were dispersed in 1 L of diethyleneglycol to prepare a starting material dispersion. The dispersion was placed in a reactor provided with a reflux cooling apparatus and then heated so that diethyleneglycol came to a boil. At this time, the heating temperature for the dispersion was about 220° C.

The XRD patterns and magnetization curves for the nickel powders at a phase transition time of 1, 2, 3, 4, 5, 6, 7, 8, 9, 10, 11, 12, and 18 hours are respectively shown in FIGS. 1 and 2.

The XRD pattern analysis for the nickel powders was performed using X'PERT-MPD system (Philips). The magnetization curves for the nickel powders were measured using MODEL4VSM 30 kOe (DMS).

EXAMPLE 2

NF1A (Toho, Japan) was used as a starting material. NF1A is nickel powders of FCC phase prepared by a vapor phase method and has an average particle size of about 150 nm. The XRD pattern and magnetization curve for NF1A are respectively shown in FIG. 3 (represented by 0 hours) and FIG. 4 (represented by 0 hours).

100 g of NF1A was dispersed in 1 L of diethyleneglycol to prepare a starting material dispersion. The dispersion was placed in a reactor provided with a reflux cooling apparatus and then heated so that diethyleneglycol came to a boil. At this time, the heating temperature for the dispersion was about 220° C.

The XRD patterns and magnetization curves for NF1A at a phase transition time of 1, 2, 3, 4, and 24 hours are respectively shown in FIGS. 3 and 4.

As apparent from the above description, the present invention provides non-magnetic nickel powders. The nickel powders have a HCP crystal structure.

The nickel powders of the present invention do not exhibit magnetic agglomeration phenomenon. Therefore, the pastes for inner electrode formation in various electronic devices, which contain the nickel powders of the present invention, can keep the well-dispersed state. Also, inner electrodes made of the nickel powders can have a low impedance value even at high frequency band.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method for preparing non-magnetic nickel powders with a HCP crystal structure, comprising:
   (a) dispersing nickel powders with a FCC crystal structure in an organic solvent to prepare a starting material dispersion; and
   (b) heating the starting material dispersion to transform the nickel powders with the FCC crystal structure to the nickel powders with the HCP crystal structure.

2. The method of claim 1, wherein the organic solvent is a glycol based compound.

3. The method of claim 2, wherein the glycol based compound is ethyleneglycol, propyleneglycol, diethyleneglycol, triethyleneglycol, dipropyleneglycol, hexyleneglycol, or butyleneglycol.

4. The method of claim 1, wherein heating the dispersion is carried out at a temperature range of 150 to 380° C.

5. The method of claim 1, wherein heating the dispersion is carried out at a temperature range of the boiling point of the organic solvent ±5° C.

6. The method of claim 1, wherein heating the dispersion is carried out so that the organic solvent of the dispersion comes to a boil.

* * * * *